(12) United States Patent
Litzinger et al.

(10) Patent No.: US 8,036,167 B2
(45) Date of Patent: Oct. 11, 2011

(54) MULTIPLE WIRELESS LOCAL AREA NETWORKS FOR RELIABLE VIDEO STREAMING

(75) Inventors: Brian Litzinger, Campbell, CA (US); Sudhanshu Gaur, Campbell, CA (US); John Simons, Half Moon Bay, CA (US); Qing Li, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 887 days.

(21) Appl. No.: 11/969,826

(22) Filed: Jan. 4, 2008

(65) Prior Publication Data

US 2009/0175251 A1    Jul. 9, 2009

(51) Int. Cl.
*H04W 4/00*    (2009.01)
(52) U.S. Cl. .......................... 370/329; 370/338; 370/341
(58) Field of Classification Search ........... 370/310–350
See application file for complete search history.

(56) References Cited

U.S. PATENT DOCUMENTS

| | | | | |
|---|---|---|---|---|
| 7,453,844 | B1* | 11/2008 | Lee et al. ...................... | 370/329 |
| 7,653,386 | B2* | 1/2010 | Bennett ....................... | 455/422.1 |
| 2004/0024915 | A1* | 2/2004 | Abe .............................. | 709/250 |
| 2005/0135284 | A1 | 6/2005 | Nanda et al. | |
| 2005/0135318 | A1 | 6/2005 | Walton et al. | |
| 2005/0141480 | A1 | 6/2005 | Jin et al. | |
| 2006/0034219 | A1 | 2/2006 | Gu et al. | |
| 2006/0062181 | A1 | 3/2006 | Chou | |
| 2006/0215593 | A1 | 9/2006 | Wang et al. | |
| 2007/0002742 | A1* | 1/2007 | Krishnaswamy et al. ..... | 370/235 |
| 2007/0109992 | A1* | 5/2007 | Bennett ......................... | 370/328 |
| 2007/0127410 | A1 | 6/2007 | Guo et al. | |
| 2007/0195787 | A1 | 8/2007 | Alnuweiri et al. | |
| 2007/0217339 | A1 | 9/2007 | Zhao | |
| 2008/0170549 | A1* | 7/2008 | Everson et al. ............... | 370/338 |
| 2008/0301752 | A1* | 12/2008 | Jung ............................. | 725/151 |
| 2010/0120361 | A1* | 5/2010 | Rappaport ..................... | 455/18 |
| 2010/0290450 | A1* | 11/2010 | Bennett ......................... | 370/338 |

* cited by examiner

*Primary Examiner* — Tri H Phan
(74) *Attorney, Agent, or Firm* — Mattingly & Malur, PC

(57) ABSTRACT

A media center system comprises a first wireless controller operative to communicate with a first set of devices on a first WLAN using a first wireless standard; a first network processor coupled to the first wireless controller and operative to establish wireless communication over a first channel with the first set of devices on the first WLAN; a second wireless controller operative to communicate with a second set of devices on a second WLAN using a second wireless standard, the second wireless controller substantially dedicated for multimedia content delivery; and a second network processor coupled to the second wireless controller and operative to establish wireless communication over a second channel with the second set of devices on the second WLAN, the second channel being different than the first channel.

20 Claims, 12 Drawing Sheets

EDCA CHANNEL ACCESS MECHANISM

DUAL WLAN ENABLED MEDIA CENTER

MULTIPLE WIRELESS LOCAL AREA NETWORKS FOR RELIABLE VIDEO STREAMING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to wireless local area networks (WLANs), and more particularly provides multiple WLANs for reliable video streaming.

BACKGROUND

The IEEE 802.11 wireless local area network (WLAN) standards are dominant standards for home and office wireless networking. With the advent of IEEE 802.11e Quality of Service (QoS) Amendment and IEEE 802.11. n High Throughput (HT) standards, WLAN has become attractive for the distribution of video content. Desired applications over a WLAN include video streaming, video conferencing, distance learning, etc. Because wireless bandwidth availability is restricted, QoS management is increasingly important in 802.11 networks. Specifically, video streaming requires strict QoS guarantees and are sensitive to external interference. Thus, WLAN networks have proven not very suitable for reliable video streaming.

The original 802.11 media access control (MAC) protocol was designed with two modes of communication for wireless stations (STAs). The first mode, Distributed Coordination Function (DCF), is based on Carrier Sense Multiple Access with Collision Avoidance (CSMA/CA), sometimes referred to as "listen before talk." A wireless station (STA) waits for a quiet period on the network and then begins to transmit data and detect collisions. The second mode, Point Coordination Function (PCF), supports time-sensitive traffic flows. Using PCF, wireless access points (APs) periodically send beacon frames to communicate network identification and management parameters specific to the wireless local area network (WLAN). Between beacon frames, PCF splits time into a contention period (CP) where the STAs implement a DCF protocol, and a contention-free period (CFP) where an AP coordinates access by the various STAs based on QoS requirements.

Because DCF and PCF do not differentiate between traffic types or sources, IEEE proposed enhancements to both coordination modes to facilitate QoS. These changes are intended to fulfill critical service requirements while maintaining backward-compatibility with current 802.11 standards.

Enhanced Distributed Channel Access (EDCA) introduces the concept of access classes (or traffic categories). Using EDCA, STAs try to send data after detecting that the wireless medium is idle for a set time period defined by the corresponding access class (AC). A higher-priority AC will have a shorter wait time than a lower-priority AC. While no guarantees of service are provided, EDCA establishes a probabilistic priority mechanism to allocate bandwidth based on ACs.

The IEEE 802.11e EDCA standard provides QoS differentiation by grouping traffic into four ACs, i.e., voice, video, best effort and background. Each transmission frame from the upper layers bears a priority value (0-7), which is passed down to the MAC layer. Based on the priority value, the transmission frames are mapped into the four ACs at the MAC layer. The voice (VO) AC has the highest priority; the video (VI) AC has the second highest priority; the best effort (BE) AC has the third highest priority; and the background (BK) AC has the lowest priority. Each AC has its own transmission queue and its own set of AC-sensitive medium access parameters. Traffic prioritization for the STAs uses the medium access parameters—the arbitration interframe space (AIFS) interval, contention window (CW, CWmin and CWmax), and transmission opportunity (TXOP)—to ensure that a higher priority AC has relatively more medium access opportunity than a lower priority AC.

Generally, in EDCA, AIFS is the time interval that a STA must sense the wireless medium to be idle before invoking a backoff mechanism or transmission. A higher priority AC uses a smaller AIFS interval. The contention window (CW, CWmin and CWmax) indicates the number of backoff time slots until the STA can attempt another transmission. The contention window is selected as a random backoff number of slots between 0 and CW. CW starts at CWmin. CW is essentially doubled every time a transmission fails until CW reaches its maximum value CWmax. Then, CW maintains this maximum value CWmax until the transmission exceeds a retry limit. A higher priority AC uses smaller CWmin and CWmax. A lower priority AC uses larger CWmin and CWmax. The TXOP indicates the maximum duration that an AC can be allowed to transmit frames after acquiring access to the medium. To save contention overhead, multiple transmission frames can be transmitted within one TXOP without additional contention, as long as the total transmission time does not exceed the TXOP duration. The active STA separates each transmission frame by a short interframe space (SIFS), which is shorter than AIFS. FIG. I illustrates the conventional EDCA channel access mechanism.

To reduce the probability of two STAs colliding, because the two STAs cannot hear each other, the standard defines a virtual carrier sense mechanism. Before a STA initiates a transaction, the STA first transmits a short control frame called RTS (Request To Send), which includes the source address, the destination address and the duration of the upcoming transaction (i.e. the data frame and the respective ACK). Then, the destination STA responds (if the medium is free) with a responsive control frame called CTS (Clear to Send), which includes the same duration information. All STAs receiving either the RTS and/or the CTS set a virtual carrier sense indicator, i.e., the network allocation vector (NAV), for the given duration, and use the NAV together with the physical carrier sense when sensing the medium as idle or busy. This mechanism reduces the probability of a collision in the receiver area by a STA that is "hidden" from the transmitter STA to the short duration of the RTS transmission, because the STA hears the CTS and "reserves" the medium as busy until the end of the transaction. The duration information in the RTS also protects the transmitter area from collisions during the ACK from STAs that are out of range of the acknowledging STA. Due to the fact that the RTS and CTS are short, the mechanism reduces the overhead of collisions, since these transmission frames are recognized more quickly than if the whole data transmission frame was to be transmitted (assuming the data frame is bigger than RTS). The standard allows for short data transmission frames, i.e., those shorter than an RTS Threshold, to be transmitted without the RTS/CTS transaction.

With these medium access parameters, EDCA generally works in the following manner:

Before a transmitting STA can initiate any transmission, the transmitting STA must first sense the channel idle (physically and virtually) for at least an AIFS time interval. If the channel is idle after the initial AIFS interval, then the transmitting STA initiates an RTS transmission and awaits a CTS transmission from the receiving STA.

If a collision occurs during the RTS transmission or if CTS is not received, then the transmitting STA invokes a backoff procedure using a backoff counter to count down a random number of backoff time slots selected between 0 and CW (initially set to CWmin). The transmitting STA decrements the backoff counter by one as long as the channel is sensed to be idle. If the transmitting STA senses the channel to be busy at any time during the backoff procedure, the transmitting STA suspends its current backoff procedure and freezes its backoff counter until the channel is sensed to be idle for an AIFS interval again. Then, if the channel is still idle, the transmitting STA resumes decrementing its remaining backoff counter.

Once the backoff counter reaches zero, the transmitting STA initiates an RTS transmission and awaits a CTS transmission from the receiving STA. If a collision occurs during the RTS transmission or CTS is not received, then the transmitting STA invokes another backoff procedure, possibly increasing the size of CW. That is, as stated above, after each unsuccessful transmission, CW is essentially doubled until it reaches CWmax. After a successful transmission, CW returns to its default value of CWmin. During the transaction, the STA can initiate multiple frame transmissions without additional contention as long as the total transmission time does not exceed the TXOP duration.

The level of QoS control for each AC is determined by the combination of the medium access parameters and the number of competing STAs in the network.

IEEE 802.11e results in better video streaming over a WLAN as compared to previous IEEE 802.11 WLAN standards. Also, the advent of IEEE 802.11n High Throughput standard may support simultaneous multiple video streams over the wireless network. However, since wireless bandwidth in a WLAN is a limited resource, devices following the IEEE 802.11e and 802.11n standards must still compete for sufficient access to ensure reliable multimedia streaming.

Examples of prior art systems are described in . . .
1. IEEE 802.11 WG, "Draft Supplement to Part 11: Wireless Medium Access Control (MAC) and Physical Layer (PHY) Specifications: Medium Access Control (MAC) Enhancements for Quality of Service (QoS)", *IEEE* 802.11e, November 2005.
2. IEEE 802.11 WG, "Draft Supplement to Part 11: Wireless Medium Access Control (MAC) and Physical Layer (PHY) Specifications: Medium Access Control (MAC) Enhancements for Higher Throughput", IEEE 802.11n, July 2006.
3. C. Lin and C-H. Choi, "TDM-based coordination function (TCF) in WLAN for high throughput", IEEE Global Telecommunications Conference, Vol. 5, pp. 3235-3239, November 2004.
4. U.S. Patent Application Publication No. 2005/0135284.
5. U.S. Patent Application Publication No. 2005/0135318.
6. U.S. Patent Application Publication No. 2005/0141480.
7. U.S. Patent Application Publication No. 2006/0034219.
8. U.S. Patent Application Publication No. 2006/0062181.
9. U.S. Patent Application Publication No. 2006/0215593.
10. U.S. Patent Application Publication No. 2007/0127410.
11. U.S. Patent Application Publication No. 2007/0195787.
12. U.S. Patent Application Publication No. 2007/0217339.

SUMMARY

One embodiment of the invention provides a home entertainment system equipped with multiple WLAN cards connected to a multimedia center system to facilitate better interference management and QoS on at least one of the WLANs to ensure reliable delivery of multimedia (e.g., video, audio, voice, animation, and/or the like) content. Although the embodiments herein are being described as facilitating video streaming, one skilled in the art will recognize that embodiments of the invention may be used to facilitate any data-type delivery.

One embodiment of the invention provides, as follows:
(i) Establishing a first WLAN for legacy devices and multimedia servers;
(ii) Establishing a second WLAN on a different channel dedicated to the distribution of video content; and
(iii) Dynamically switching the channel of the second WLAN using feedback from video clients.

Embodiments of the invention may allow the separation of legacy devices operating on a conventional IEEE 802.11 WLAN from dedicated video devices operating on a more reliable multimedia-centric WLAN. Embodiments may also lead to improved interference management and implementation of standard and/or proprietary technologies for reliable video streaming on a multimedia-centric WLAN.

In accordance with one embodiment, the present invention provides a media center system, comprising a first wireless controller operative to communicate with a first set of devices on a first WLAN using a first wireless standard; a first network processor coupled to the first wireless controller and operative to establish wireless communication over a first channel with the first set of devices on the first WLAN; a second wireless controller operative to communicate with a second set of devices on a second WLAN using a second wireless standard, the second wireless controller substantially dedicated for multimedia content delivery; and a second network processor coupled to the second wireless controller and operative to establish wireless communication over a second channel with the second set of devices on the second WLAN, the second channel being different than the first channel.

For the media center system, the first wireless controller may be configured as a wireless access point that manages the first WLAN or as a wireless station in wireless communication with an external access point that manages the first WLAN. The first wireless standard and second wireless standard may be the same standard. The first wireless standard may be a public standard and the second wireless standard may be a proprietary standard. The proprietary standard may be designed to provide reliable quality of service for video-based streaming. The media center system may further comprise a first bridge communication module coupled to the first wireless controller; a second bridge communication module coupled to the second wireless controller; and a bridge coupling the first bridge communication module and the second bridge communication module. The media center system may further comprise a channel monitor capable of monitoring channel characteristics of at least one other channel of the second WLAN. The channel monitor may include a third wireless controller operative to monitor the channel characteristics of the at least one other channel while the second wireless controller is operating; a third network processor coupled to the third wireless controller and operative to establish communication over the at least one other channel; and a third bridge communication module coupled to the third wireless controller and to the bridge. The channel monitor may be associated with at least one of the devices of the second set of devices, and may be configured to monitor the channel characteristics of the at least one other channel during a time period while another device of the second set of devices is using the second channel. The media center system may further comprise a channel selection module operative to select a new channel from the at least one other channel based on the channel characteristics of the at least one other channel, and operative to configure the second network processor to switch to the new channel.

In accordance with one embodiment, the present invention provides a method, comprising communicating with a first set of devices on a first WLAN using a first wireless controller and a first wireless standard; establishing wireless communication over a first channel with the first set of devices on the first WLAN using a first network processor coupled to the first wireless controller; communicating with a second set of devices on a second WLAN using a second wireless controller and a second wireless standard, the second wireless controller substantially dedicated to multimedia content delivery; establishing wireless communication over a second channel with the second set of devices on the second WLAN using a second network processor coupled to the second wireless controller, the second channel being different than the first channel.

For the method, the first wireless controller may be configured as a wireless access point that manages the first WLAN or as a wireless station in wireless communication with an external access point that manages the first WLAN. The first wireless standard and second wireless standard may be the same standard. The first wireless standard may be a public standard and the second wireless standard may be a proprietary standard. The method may further comprise monitoring channel characteristics of at least one other channel of the second WLAN. The step of monitoring may include using a third wireless controller to monitor the channel characteristics of the at least one other channel while the second wireless controller is operating. The method may further comprise establishing communication over the at least one other channel using a third network processor coupled to the third wireless controller and establishing communication between a third bridge communication module and the bridge. The step of monitoring may be performed by at least one of the devices of the second set of devices, and may include monitoring the channel characteristics of the at least one other channel during a time period while another device of the second set of devices is using the second channel. The method may further comprise selecting a new channel from the at least one other channel based on the channel characteristics of the at least one other channel, and configuring the second network processor to switch to the new channel.

In accordance with one embodiment, the present invention provides a system, comprising a first wireless controller operative to communicate with a set of devices on a WLAN using a wireless standard; a first network processor coupled to the first wireless controller and operative to establish wireless communication over a first channel with the set of devices on the WLAN; a second wireless controller operative to monitor channel characteristics of a second channel of the WLAN different than the first channel while the first wireless controller is operating; and a second network processor coupled to the second wireless controller and operative to establish communication over the second channel.

DETAILED DESCRIPTION

The following description is provided to enable any person skilled in the art to make and use the invention. Various modifications to the embodiments are possible, and the generic principles defined herein may be applied to these and other embodiments and applications without departing from the spirit and scope of the invention. Thus, the invention is not intended to be limited to the embodiments and applications shown, but is to be accorded the widest scope consistent with the principles, features and teachings disclosed herein.

One embodiment of the invention provides a home entertainment system equipped with multiple WLAN cards connected to a multimedia center system to facilitate better interference management and QoS on at least one of the WLANs to ensure reliable delivery of multimedia (e.g., video, audio, voice, animation, and/or the like) content. Although the embodiments herein are being described as facilitating video streaming, one skilled in the art will recognize that embodiments of the invention may be used to facilitate any data-type delivery.

One embodiment of the invention provides, as follows:
(iv) Establishing a first WLAN for legacy devices and multimedia servers;
(v) Establishing a second WLAN on a different channel dedicated to the distribution of video content; and
(vi) Dynamically switching the channel of the second WLAN using feedback from video clients.

Embodiments of the invention may allow the separation of legacy devices operating on a conventional IEEE 802.11 WLAN from dedicated video devices operating on a more reliable multimedia-centric WLAN. Embodiments may also lead to improved interference management and implementation of standard and/or proprietary technologies for reliable video streaming on a multimedia-centric WLAN.

Figure 1:
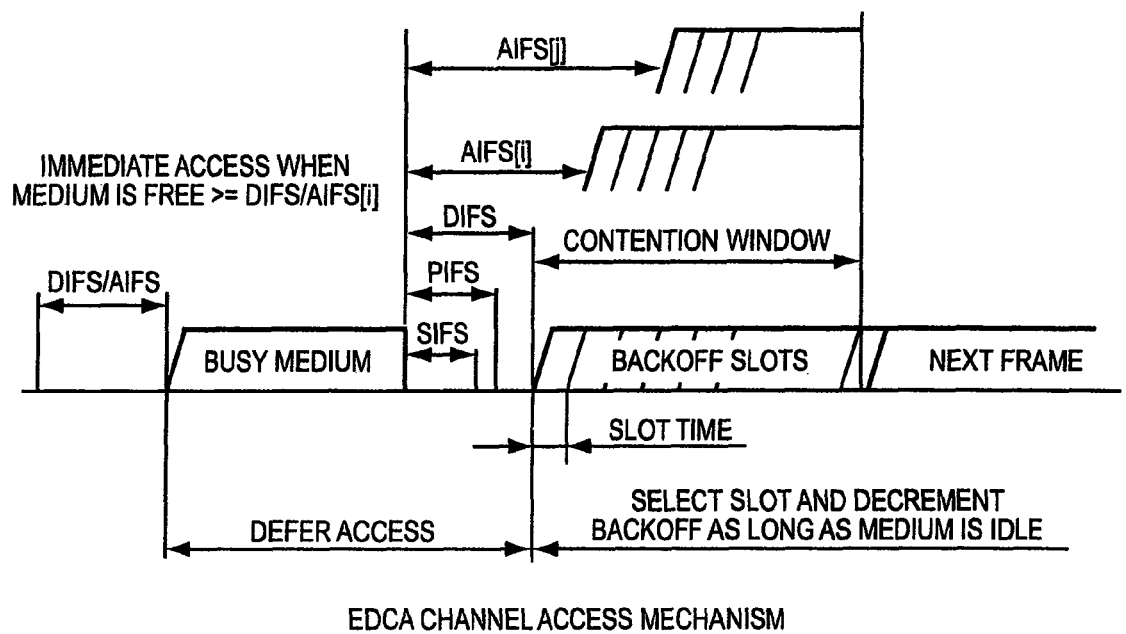
FIG. 1 illustrates the prior art 802.11e access mechanism.
Figure 2:
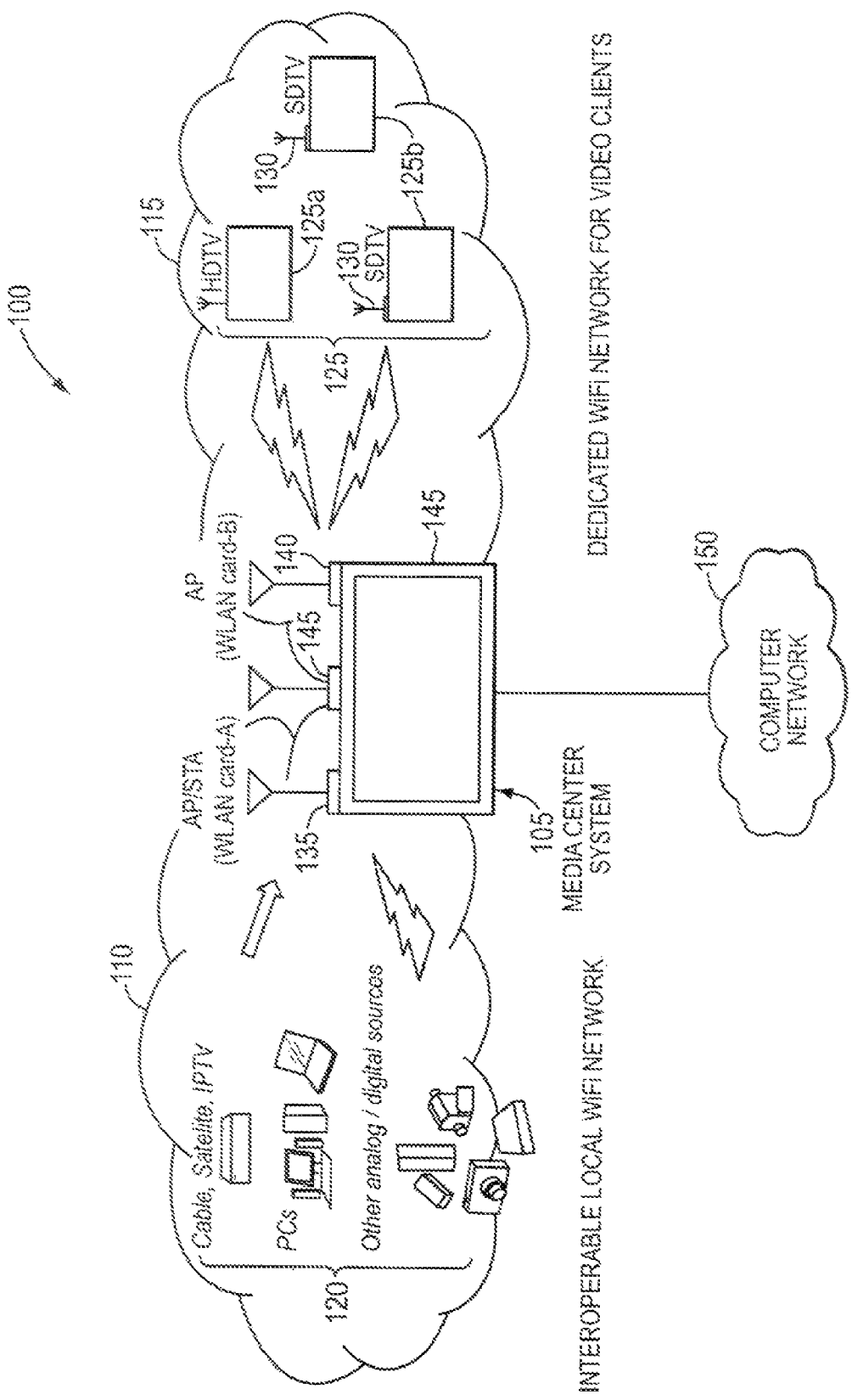
FIG. 2 is a block diagram illustrating a multiple WLAN network, in accordance with an embodiment of the present invention.

FIG. 2 is a block diagram illustrating a multiple WLAN network 100, in accordance with an embodiment of the present invention. Multiple WLAN network 100 includes a multiple WLAN enabled media center system 105 that manages or interoperates with a first WLAN 110 (WLAN-A) and that manages a second WLAN 115 (WLAN-B), and is coupled to a computer network 150, e.g., the wide-area network commonly referred to as the Internet. In one embodiment, the WLAN-A follows public WLAN standards, e.g., IEEE 802.11a/b/g/e/n WLAN standards, for legacy devices (STAs) 120. The legacy devices 120 may include non-video WLAN clients, multimedia servers, PCs, laptops, cable or satellite devices, etc. In one embodiment, the WLAN-B follows proprietary WLAN standards, e.g., a Hitachi-developed multimedia-centric standard, for communication with multimedia-centric devices 125. As shown, the media center system 105 includes a WLAN-A card 135 (card-A) that manages or interoperates with WLAN-A, a WLAN-B card 140 (card-B) that manages WLAN-B, a WLAN card 145 (card-C) dedicated to channel monitoring, and a video device 145 for presenting multimedia content.

Card-A operates as an access point (AP) that manages WLAN-A or operates as a STA with an external AP that manages WLAN-A. If WLAN-A is not managed by an external AP, then the card-A operates as a wireless AP, possibly using public WLAN standards, e.g., IEEE 802.11a/b/g/e/n WLAN standards. As an AP, card-A receives and forwards the wireless packets from the legacy devices 120 as requested. Alternatively, if WLAN-A is managed by an external AP (not shown), then card-A may operate as a wireless STA of WLAN-A, cooperating with the external AP to indirectly communicate with the legacy devices 120. As a STA, in one embodiment, card-A receives wireless packets from the external AP when the wireless packets are addressed by the original source of the wireless packets to card-A. As a STA, in one embodiment, card-A may be configured to recognize the addresses of the video devices 125 of WLAN-B, so that card-A knows to forward the wireless packets to card-B. As a STA, in one embodiment, card-A also receives wireless packets destined for the computer network 150. In one embodiment, from the perspective of card-A, the external AP appears to be the source of the wireless packets.

Card-B operates as a wireless AP to manage WLAN-B. In one embodiment, card-B uses proprietary WLAN standards, e.g., a Hitachi-developed multimedia-centric standard, for communication with video devices 125. The video devices 125 may include high-definition televisions (HDTVs) 125a and standard-definition televisions (SDTV) 125b. In one embodiment, each SDTV 125b is attached to a set bop box 130 that has a wireless STA built therein. In one embodiment, each HDTV 125a has a wireless STA built therein.

Card-C operates as a dedicated channel monitor to dynamically monitor various characteristics of available channels of WLAN-A and/or WLAN-B. Card-C may operate continuously, periodically, at predetermined times, by user request, after predetermined events, by card and/or device request, etc. Card-C switches to different channels of WLAN-A and/or WLAN-B without any need for AP association and receives wireless packets on the channel. Card-C monitors channel characteristics, e.g., signal strength, error rates, traffic load per traffic category, etc. Then, based on the channel characteristics determined by card-C, the media center system 105 instructs card-B and possibly card-A of channel characteristics and/or which channel to use and/or when to switch channels.

The video device 145 may include an HDTV, which may be coupled to the wide-area network commonly referred to as the Internet. The video device 145 may also be equipped with a card that is compatible with WLAN-A and a card that is compatible with WLAN-B.

Initialization

In one embodiment, card-A is initially configured as a STA and scans all channels to search for an external AP that manages WLAN-A. If an external AP exists, then card-A associates with it and card-B is configured as an AP on the best available channel other than the channel on which card-A is tuned. If an external AP does not exist, then card-B is configured as an AP on the best available channel to manage WLAN-B, and card-A is configured as a legacy AP on the best available channel different from card-B to manage WLAN-A. The video clients 125 associate with card-B. The legacy devices 120 associate with card-A, directly or via the external AP. Bridging may be established between the WLAN cards, in this case, card-A and card-B, allowing legacy devices 120 of WLAN-A to communicate with video clients 125 of WLAN-B.

Video Streaming

The multimedia content source may be the computer network 150, a playback device at the media center system 105., or a legacy device 120 in WLAN-A. The target device may be the video device 145 at the multimedia center 105 or one of the display devices 125 of WLAN-B. (Although not discussed herein, the multimedia content may be streamed to one or more legacy devices 120.)

If the multimedia content source is a legacy device 120 in WLAN-A, then card-A obtains the multimedia content over WLAN-A from the legacy device 120 using a unicast protocol. If the multimedia content source is either a playback device at the media center system 105 or the computer network 150, then card-A need not be used. If the target device is the video device 145, then the multimedia content may be transmitted to the video device 145 using a wired network. If the target device is a video device 125 on WLAN-B, then card-B transmits the multimedia content over WLAN-B using unicast or multicast protocols. A bridge may be used to communicate multimedia content between card-A and card-B.

Interference Avoidance

In one embodiment, a dedicated channel monitor such as card-C may be used to monitor channel characteristics of WLAN-A and/or WLAN-B. The dedicated channel monitor may be within the media center, a separate device, or within another device. In one embodiment, the media center system 105 uses the channel characteristics to select the best channels for WLAN-A and WLAN-B. In one embodiment, card-C feeds the channel characteristics to card-A and/or card-B, which use(s) the data to select the best channel for WLAN-A and/or WLAN-B. In one embodiment, card-C selects the channels for card-A and/or card-B. Further, in one embodiment, multiple dedicated channel monitors may be disposed at different locations within WLAN-A and/or WLAN-B to provide local channel characteristics for channel selection.

In one embodiment, the media center system 105 prioritizes WLAN-B over WLAN-A, giving WLAN-B the better channel available.

Figure 10:
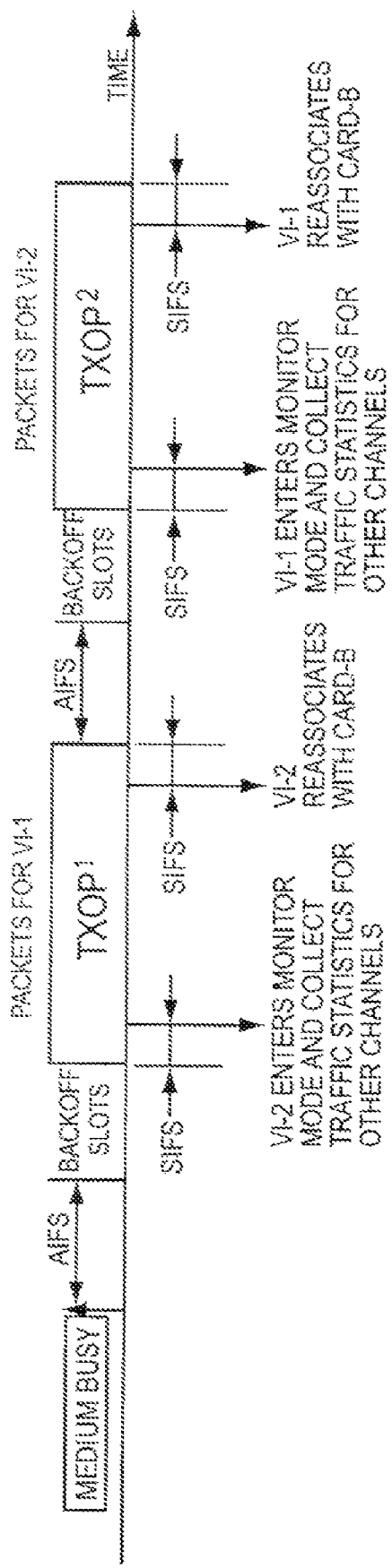
FIG. 10 is a timing diagram illustrating the monitoring of channel conditions by a non-target video device on WLAN-B, in accordance with an embodiment of the present invention.

In one embodiment, each of the video devices 125 may include a channel monitoring mechanism. Further, the media center system 105 may also include a channel monitoring mechanism, e.g., within card-A, card-B and/or card-C. When content is not being addressed to a video device 125 (at which time the video device 125 is referred to herein as a "non-target" video device 125), the non-target video device 125 enters "monitor mode." The non-target video device 125 initiates monitor mode after a predetermined time interval, e.g., a SIFS interval, after the beginning of a TXOP to the target video device 125, as shown in FIG. 10. While in monitor mode, the non-target video device 125 switches to other channels and gathers channel characteristics. The non-target video device 125 ceases monitor mode a SIFS duration before the end of the current TXOP, as shown in FIG. 10. After exiting monitor mode, the non-target video device 125 reassociates with card-B.

A target video device 125 sends a channel report to card-B, possibly by piggybacking the ACK packets. In one embodiment, a target video device 125 is configured to send a channel report only after it has completed a full channel scan of all other channels. In one embodiment, a target video device 125 sends a channel report after it has completed a channel scan of one channel. Other embodiments are also possible. In one embodiment, card-B uses the channel reports from the video devices 125 to select a new channel, if needed. Card-B broadcasts the new channel information, including channel number and relative switch time, so that the video devices 125 can synchronize the switch to the new channel and avoid content loss.

Figure 3:
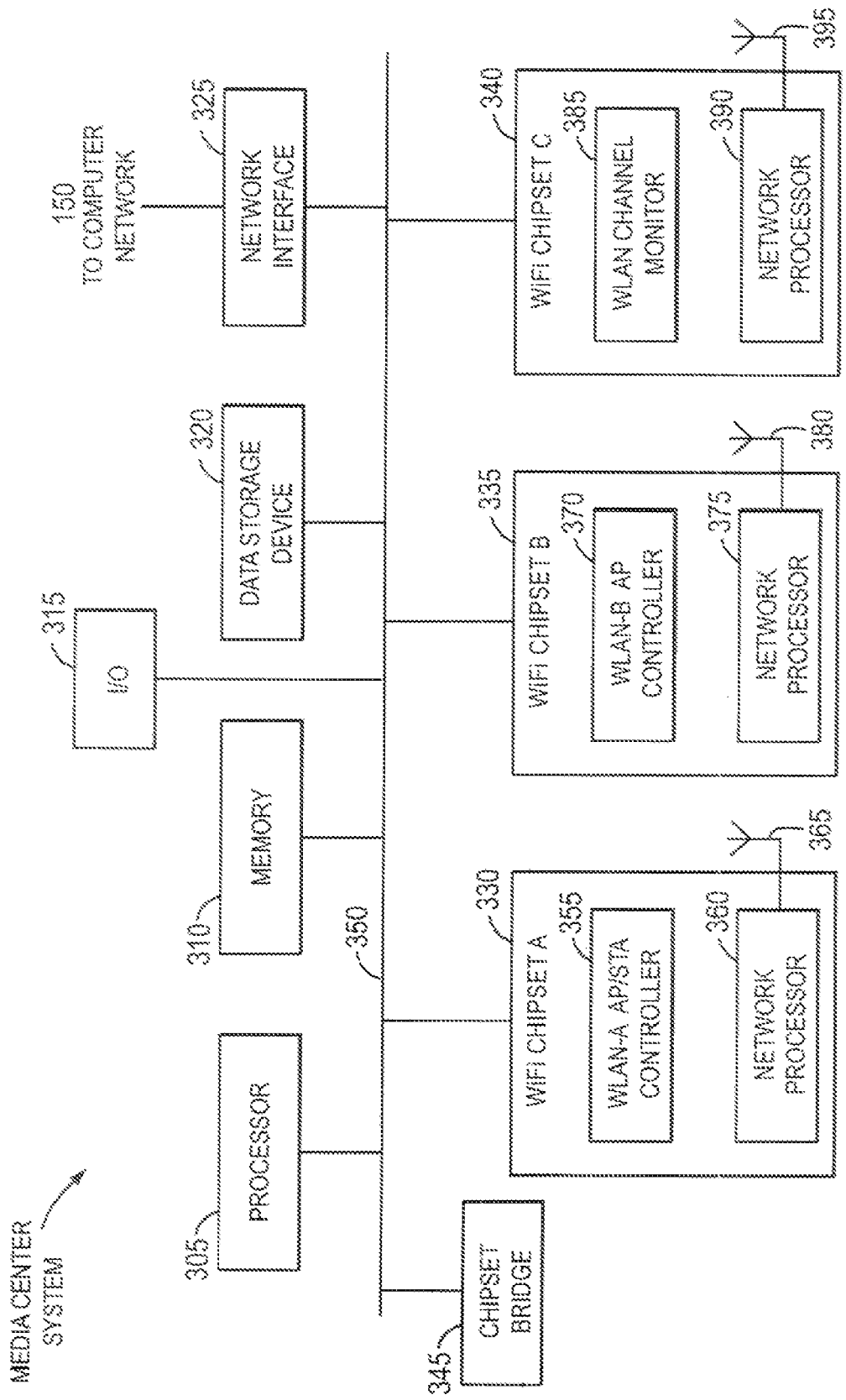
FIG. 3 is a block diagram illustrating details of the media center system of FIG. 2, in accordance with an embodiment of the present invention.

FIG. 3 is a block diagram illustrating details of the media center system 105, in accordance with an embodiment of the present invention. The media center system 105 includes a processor 305 (such as an Intel Pentium® microprocessor or a Motorola Power PC® microprocessor), memory 310 (such as random-access memory), a data storage device 715 (such as a magnetic disk), input/output (I/O) 315 (such as a keyboard, mouse and LCD display), a network interface 325 (such as a broadband modem that may be coupled to the computer network 150), a first WiFi chipset 330 (card-A), a second WiFi chipset 335 (card-B), a third WiFi chipset 340 (card-C), and a chipset bridge 345 for enabling communication between card-A, card-B and card-C, each coupled to a communication channel 350. One skilled in the art will recognize that, although the memory 310 and the data storage device 320 are illustrated as different units, the memory 310 and the data storage device 320 can be parts of the same unit, distributed units, virtual memory, etc. The term "memory" herein is intended to cover all data storage media whether permanent or temporary.

Card-A includes a WLAN-A AP/STA controller 355 (referred to herein as controller-A) and a network processor 360 coupled to a wireless antenna 365. Details of controller-A are shown and described with reference to FIG. 4. Card-B includes a WLAN-B AP controller 370 (referred to herein as controller-B) and a network processor 375 coupled to a wireless antenna 380. Details of controller-B are shown and described with reference to FIG. 5. Card-C includes a WLAN channel monitor 385 and a network processor 390 coupled to a wireless antenna 395. Details of the WLAN channel monitor 385 are shown and described with reference to FIG. 6.

Figure 4:
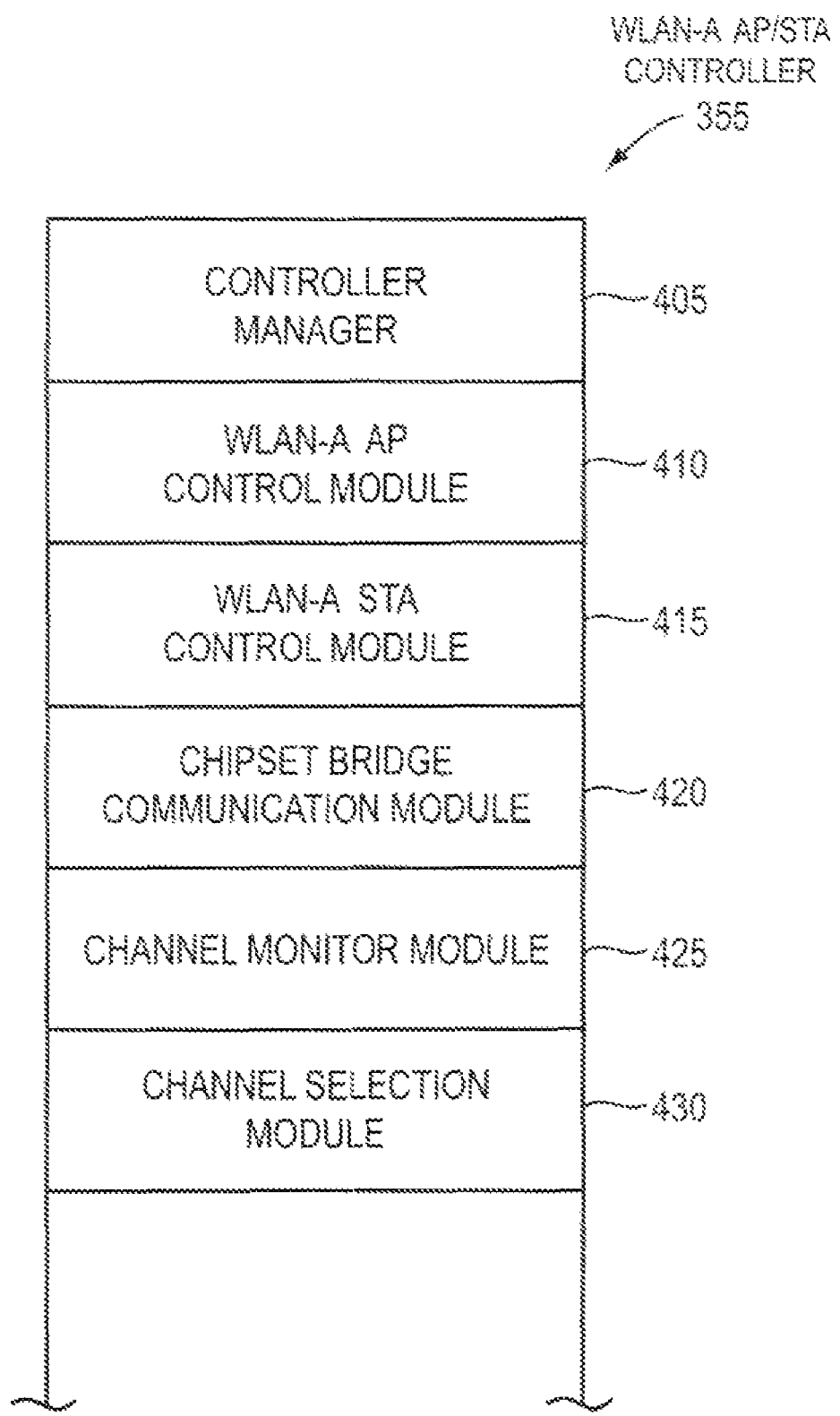
FIG. 4 is a block diagram illustrating details of the WLAN-A AP/STA controller of FIG. 3, in accordance with an embodiment of the present invention.

FIG. 4 is a block diagram illustrating details of the WLAN-A AP/STA controller 355 (controller-A), in accordance with an embodiment of the present invention. Controller-A includes a controller manager 405, a WLAN-A AP control module 410, a WLAN-A STA control module 415, a chipset bridge communication module 420, a channel monitor module 425, and a channel selection module 430.

The controller manager 405 includes hardware, software and/or firmware to configure card-A as a STA or as an AP. The controller manager 405 initially activates the WLAN-A STA control module 415 (described below) to act as a STA and to scan all available channels for an external AP to associate with. If the controller manager 405 identifies an external AP, then the controller manager 405 configures controller-A to remain as a STA, by maintaining activation of the WLAN-A STA control module 415 and associating with the external AP. If the controller manager 405 does not identify an external AP, then the controller manager 405 configures controller-A to act as an AP, by activating the WLAN-A AP control module 410 (described below). In another embodiment, the controller manager 405 enables the user to configure controller-A to operate as either a STA or an AP.

The WLAN-A AP control module 410 includes hardware, software and/or firmware to enable controller-A to act as an AP. In one embodiment, the WLAN-A AP control module 410 is configured to follow IEEE 802.11a/b/g/e/n standards.

The WLAN-A STA control module 415 includes hardware, software and/or firmware to enable controller-A to act as a STA. In one embodiment, the WLAN-A STA control module 415 is configured to follow IEEE 802.11 a/b/g/e/n standards.

The chipset bridge communication module 420 includes hardware, software and/or firmware to enable controller-A to communicate with the chipset bridge 345, and thus with other wireless chipsets, e.g., card-B and/or card-C.

The channel monitor module 425 includes hardware, software and/or firmware to monitor channel characteristics of WLAN-A and/or WLAN-B, for example, when controller-A is operating as an AP. The channel monitor module 425 forwards tile channel characteristics to the channel selection module 430. In one embodiment, the channel monitor module 425 monitors channel characteristics of WLAN-A and/or WLAN-B, and forwards the channel characteristics to card-B and/or card-C. In one embodiment, the channel monitor module 425 is capable of configuring the network processor 360 to switch channels for monitoring.

The channel selection module 430 includes hardware, software and/or firmware to select a channel for use by card-A. When operating as a STA, the channel selection module 430 configures the network processor 360 to use the channel used by the external AP. When controller-A is operating as an AP, the channel selection module 430 may gather information to select a channel. In one embodiment, the channel selection module 430 obtains channel characteristics from the channel monitor module 425. In one embodiment, the channel selection module 430 polls the legacy devices 120 for channel characteristics, e.g., signal strength, error rates, etc. In one embodiment, the channel selection module 430 obtains channel characteristics from other chipsets, e.g., card-B and/or card-C. In one embodiment, the channel selection module 430 receives channel selection from other chipsets, e.g., card-B and/or card-C. In one embodiment, the user may select a channel. Combinations of these channel selection mechanisms are possible. Other channel selection mechanisms are also possible. Upon selection of a channel, the channel selection module 430 configures the network processor 360 to switch to the selected channel.

Figure 5:
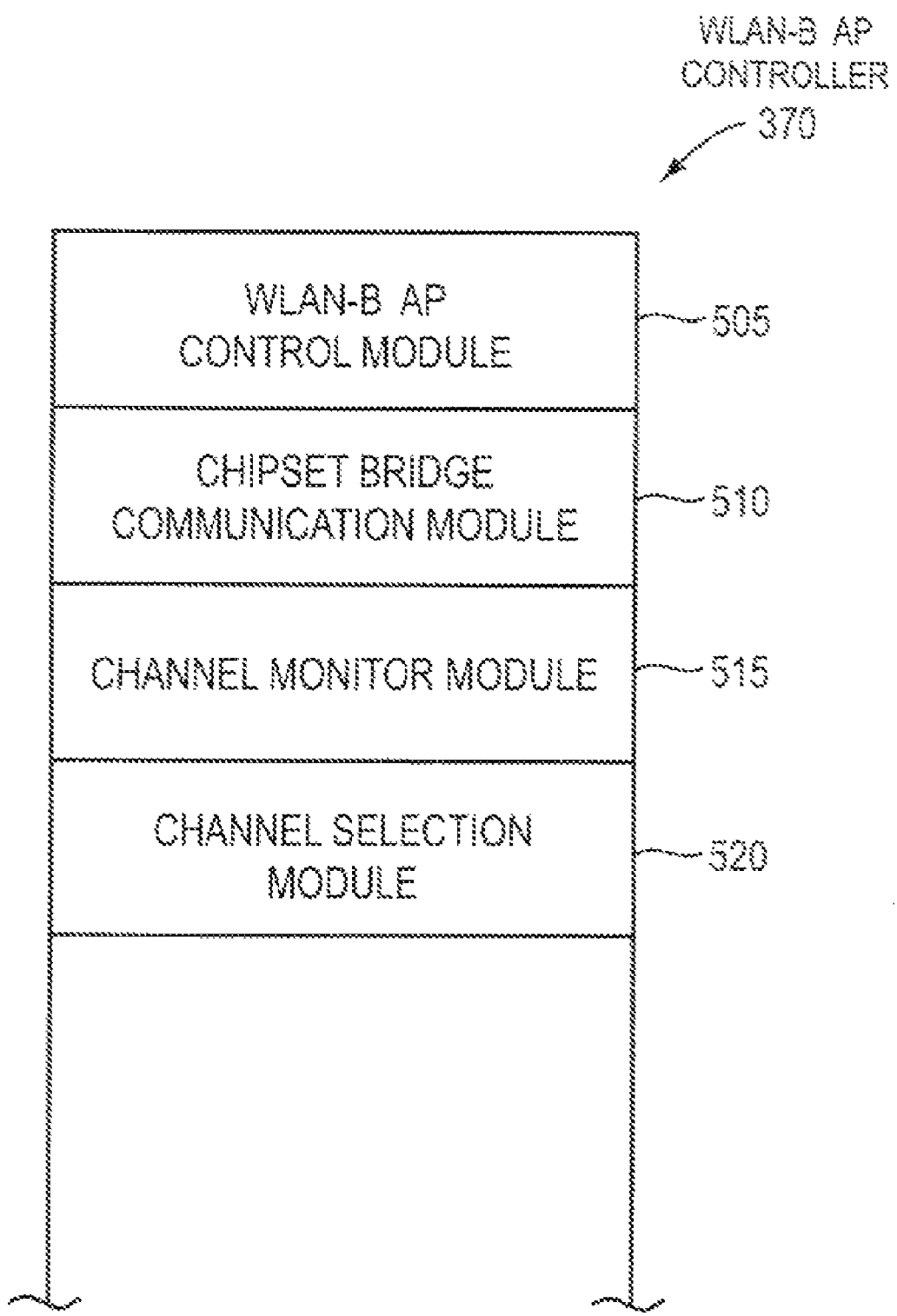
FIG. 5 is a block diagram illustrating details of the WLAN-B AP controller of FIG. 3, in accordance with an embodiment of the present invention.

FIG. 5 is a block diagram illustrating details of the WLAN-B AP controller 370 (controller-B), in accordance with an embodiment of the present invention. Controller-B includes a WLAN-B AP control module 505, a chipset bridge communication module 510, a channel monitor module 515, and a channel selection module 520. Although not shown, controller-B may be configurable like controller-A as a STA. However, like many other features and functions of the various elements and steps described herein, such additional functionality is not shown or described for convenience.

The WLAN-B AP control module 505 includes hardware, software and/or firmware to enable the controller-B to act as an AP. In one embodiment, the WLAN-B AP control module 505 is configured to follow proprietary video-centric transmission standards. In one embodiment, the WLAN-B AP control module 505 is configured to follow IEEE 802.11a/b/g/e/n standards.

The chipset bridge communication module 510 includes hardware, software and/or firmware to enable controller-B to communicate with the chipset bridge 345, and thus with other wireless chipsets, e.g., card-A and/or card-C.

The channel monitor module 515 includes hardware, software and/or firmware to monitor channel characteristics of various channels of WLAN-B and possibly of WLAN-A. The channel monitor module 515 forwards the channel characteristics of the various channels to the channel selection module 520. In one embodiment, the channel monitor module 515 forwards the channel characteristics of the various channels to card-A and/or card-C. In one embodiment, the channel monitor module 515 is capable of configuring the network processor 380 to switch channels for monitoring.

The channel selection module 520 includes hardware, software and/or firmware to select a channel for use by card-B and/or to select a channel for use by card-A. If card-A is operating as a STA, then in one embodiment the channel selection module 520 of card-B awaits disclosure of the channel in use by WLAN-A, so that the channel selection module 520 of card-B does not select the same or an overlapping channel. Alternatively, the channel selection module 520 of card-B may determine the channel being used by the external AP of WLAN-A independently. If card-A is being configured to operate as an AP, then the channel selection module 520 may be configured to select the best channel as a priority over the channel to be used by card-A.

In one embodiment, the channel selection module 520 obtains channel characteristics from the channel monitor module 515. In one embodiment, the channel selection module 520 polls the video devices 125 for channel characteristics. In one embodiment, the channel selection module 520 obtains channel characteristics from other chipsets, e.g., card-A and/or card-C. In one embodiment, the channel selection module 520 receives channel selection from other chipsets, e.g., card-A and/or card-C. In one embodiment, the channel selection module 520 enables the user to select the channel. Combinations of these channel selection mechanisms are possible. If card-A is operating as an AP, after the channel selection module 520 of card-B has selected its best channel, the channel selection module 520 may select the next best channel for card-A. Other channel selection mechanisms are also possible. Upon selection of a channel, the channel selection module 520 configures the network processor 375 to switch to the selected channel.

It will be appreciated that one of the legacy devices 120 may be the source of a video stream addressed to the display device 145 at the media center 105 or to a video device 125 in WLAN-B. If a video stream is addressed to the display device 145, then the WLAN-A AP control module 410 or the WLAN-A STA control 415 (whichever is appropriate) of card-A receives the video stream transmitted by the legacy device 120, and forwards the video stream to the I/O 315, which is connected to or includes the display device 145. If the video stream is addressed to a video device 125 in WLAN-B, then the WLAN-A AP control module 410 or the WLAN-A STA control 415 (whichever is appropriate) of card-A receives the video stream transmitted by the legacy device 120, and forwards the video stream to the chipset bridge communication module 420 of card-A. The chipset bridge communication module 420 of card-A forwards the video stream to the chipset bridge 345, which forwards the video stream to the chipset bridge communication module 510 of card-B. The chipset bridge communication module 510 of card-B forwards the video stream to the WLAN-B AP control module 505, which transmits it via WLAN-B to the target video device 125.

It will be appreciated that a service provider on the computer network 150 may be the source of the video stream addressed to the display device 145 at the media center system 105 or to a video device 125 in WLAN-B. If the video stream is addressed to the display device 145, then the network interface 325 receives the video stream transmitted by the service provider, and forwards the video stream to the I/O 315, which is connected to or includes the display device 145. If the video stream is addressed to a video device 125 in WLAN-B, then the network interface 325 receives the video stream transmitted by the service provider, and forwards the video stream to the chipset bridge 345. The chipset bridge 345 forwards the video stream to the chipset bridge communication module 510 of card-B. The chipset bridge communication module 510 of card-B forwards the video stream to WLAN-B AP control module 505, which transmits the video stream via WLAN-B to the target video device 125.

It will be appreciated that a playback device located at the media center system 105 may be the source of the video stream addressed to the display device 145 at the media center system 105 or to a video device 125 in WLAN-B. If the video stream is addressed to the display device 145, then the I/O 315, which is connected to or includes the playback device, receives the video stream from the playback device, and forwards the video stream to the I/O 315, which is connected to or includes the display device 145. If the video stream is addressed to a video device 125 in WLAN-B, then the I/O 315 receives the video stream from the playback device, and forwards the video stream to the chipset bridge 345. The chipset bridge 345 forwards the video stream to the chipset bridge communication module 510 of card-B. The chipset bridge communication module 510 of card-B forwards the video stream to WLAN-B AP control module 505, which transmits the video stream via WLAN-B to the target video device 125.

The content stream may be made reliable using standard and/or proprietary technologies, e.g., FEC algorithms, retransmissions, etc.

It will be further appreciated that the I/O 315 of the media center system 105 may allow the user to select the multimedia content, the multimedia content source, the target video device 145 or 125, the time of delivery, etc.

Figure 6:
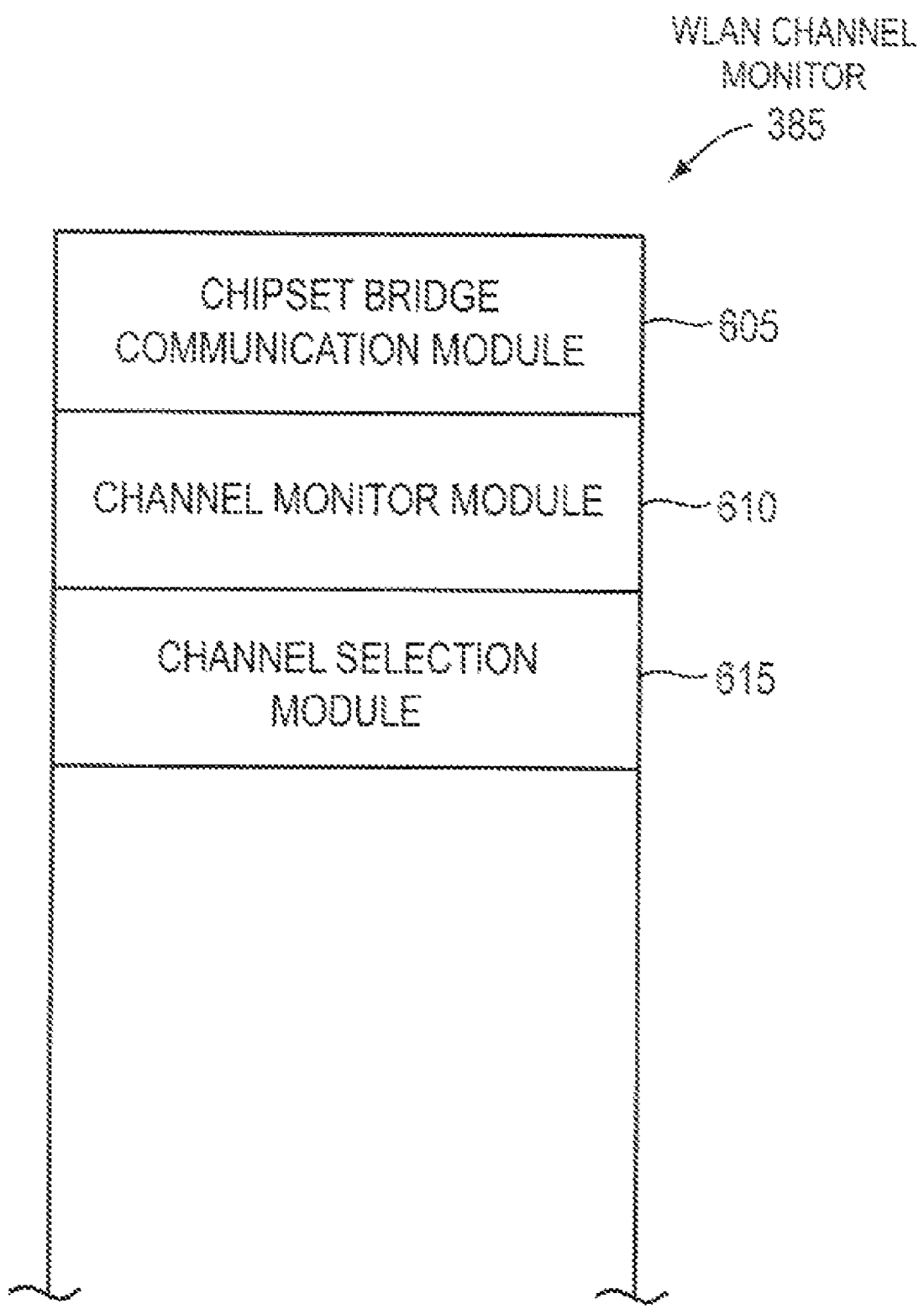
FIG. 6 is a block diagram illustrating details of the WLAN channel monitor of FIG. 3, in accordance with an embodiment of the present invention.

FIG. 6 is a block diagram illustrating details of the WLAN channel monitor 385, in accordance with an embodiment of the present invention. WLAN channel monitor 385 includes a chipset bridge communication module 605, a channel monitor module 610, and a channel selection module 615.

The chipset bridge communication module 605 includes hardware, software and/or firmware to enable card-C to communicate with the chipset bridge 345, and thus with other wireless chipsets, e.g., card-A and/or card-B.

The channel monitor module 610 includes hardware, software and/or firmware to monitor channel characteristics of the channels available on WLAN-A (possibly using IEEE 802.11a/b/g/e/n standards) and/or WLAN-B (possibly using proprietary video-dedicated transmission standards or IEEE 802.11a/b/g/e/n standards). In one embodiment, the channel monitor module 610 is capable of configuring the network processor 390 to switch channels for monitoring. In one embodiment, the channel monitor module 610 communicates the channel characteristics to card-A and/or card-B (so that card-A and/or card-B can select the best channels).

The channel selection module 615 includes hardware, software and/or firmware to enable selection of the best channel for WLAN-A and/or WLAN-B. In one embodiment, the channel selection module 615 uses the channel characteristics determined by the channel monitor module 610 to determine the best channel(s) for card-A and/or card-B. In one embodiment, the channel selection module 615 obtains channel characteristics from card-A and/or card-B to determine the best channel for card-A and/or card-B. Upon selection of the best channel for card-A and/or card-B, the channel selection module 615 sends the channel selection(s) to card-A and/or card-B. In one embodiment, the channel selection module 615 is capable of configuring the network processor 360 of card-A and/or the network processor 375 of card-B to switch to the selected channel(s).

Figure 7:
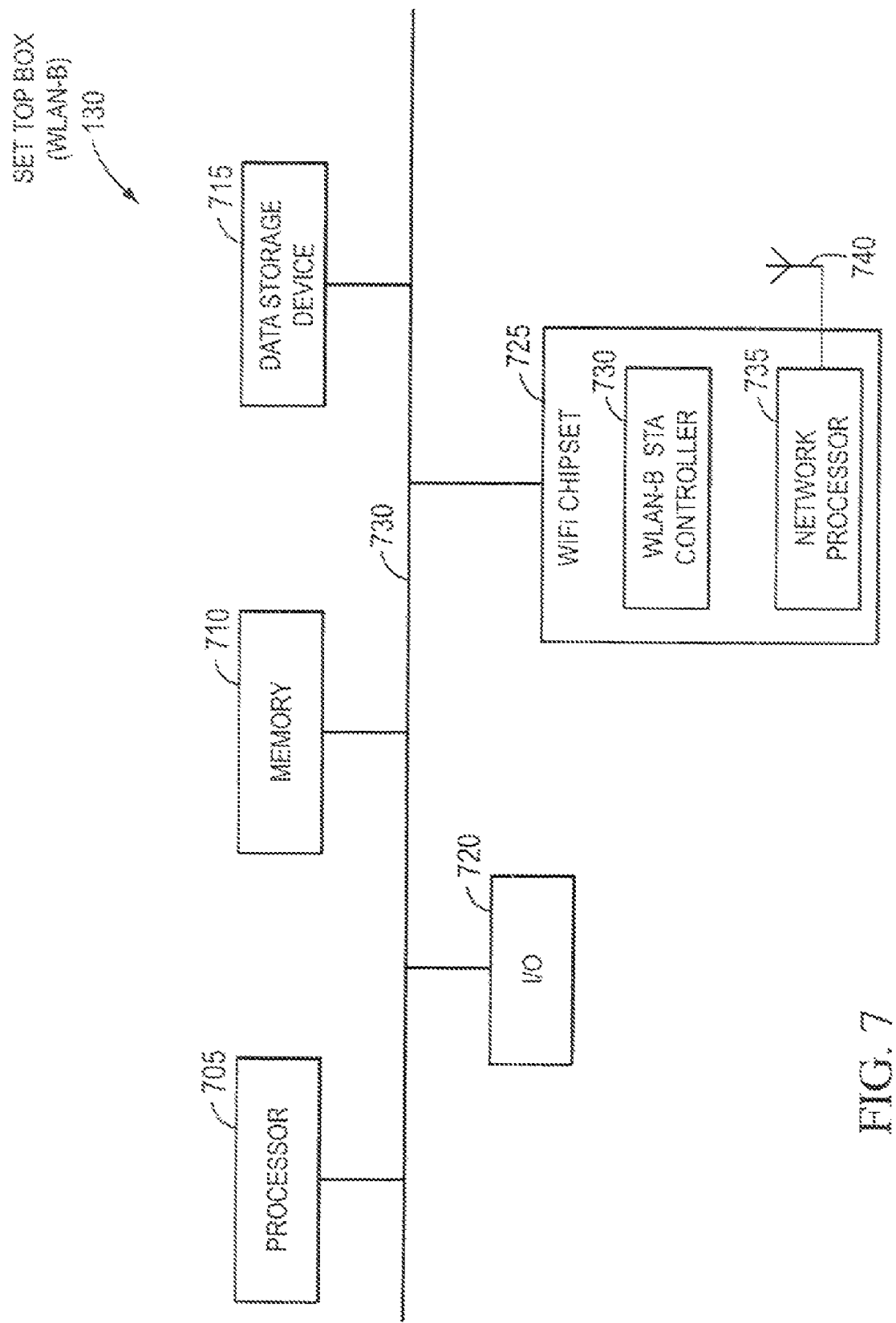
FIG. 7 is a block diagram illustrating details of a set top box in WLAN-B of FIG. 2, in accordance with an embodiment of the present invention.

FIG. 7 is a block diagram illustrating details of the set top box 130 of the WLAN-B, in accordance with an embodiment of the present invention. In one embodiment, each set top box 130 includes a processor 705 (such as an Intel Pentium® microprocessor or a Motorola Power PC® microprocessor), memory 710 (such as random-access memory), a data storage device 715 (such as a magnetic disk), input/output (I/O) 720 (such as a keyboard, mouse and LCD display), and a WiFi chipset 725, each coupled to a communication channel 730. One skilled in the art will recognize that, although the memory 710 and the data storage device 715 are illustrated as different units, the memory 710 and the data storage device 715 can be parts of the same unit, distributed units, virtual memory, etc. The term "memory" herein is intended to cover all data storage media whether permanent or temporary. The WiFi chipset 725 includes an WLAN-B STA controller 730 and a network processor 735 coupled to a wireless antenna 740. Details of the WLAN-B STA controller 730 are shown and described with reference to FIG. 8. It will be appreciated that the HDTV 125a may include some or all of the components of the set top box 130, to enable the set top box 130 functionality without a separate box.

Figure 8:
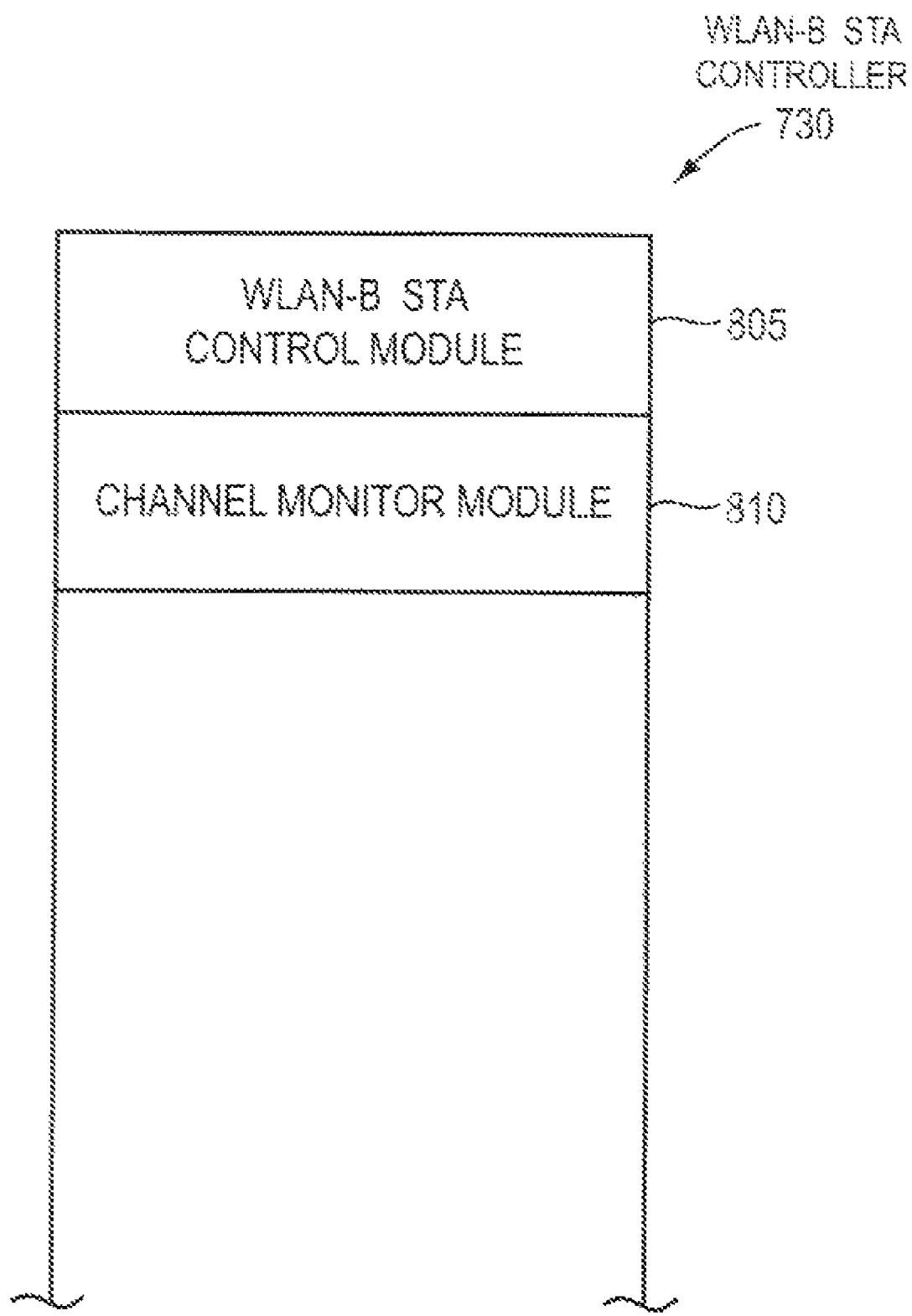
FIG. 8 is a block diagram illustrating details of the WLAN-B STA controller of the set top box of FIG. 7, in accordance with an embodiment of the present invention.

FIG. 8 is a block diagram illustrating details of the WLAN-B STA controller 730, in accordance with an embodiment of the present invention. The WLAN-B STA controller 730 includes a WLAN-B STA control module 805 and a channel monitor module 810.

The WLAN-B STA control module 805 includes hardware, software and/or firmware to enable the set top box 130 to act as a STA. In one embodiment, the WLAN-B STA control module 805 is configured to follow proprietary video-specific transmission standards and/or to follow IEEE 802.11a/b/g/e/n standards, based on the configuration of card-B. Upon receiving new channel selection information including channel number and relative switch time from card-B, the WLAN-B STA control module 805 configures the network processor 735 to switch to the new channel at the appropriate time.

The channel monitor module 810 includes hardware, software and/or firmware to monitor channel characteristics of the channels available on WLAN-B. When a video stream is not being addressed to the associated video device 125, the channel monitor module 810 of the non-target video device 125 enters "monitor mode." The channel monitor module 810 initiates monitor mode after a predetermined time interval, e.g., a SIFS interval, after the beginning of a TXOP to the target video device 125, as shown in FIG. 10. While in monitor mode, the channel monitor module 810 switching to other channels and gathers channel characteristics. The channel monitor module 810 ceases monitor mode a SIFS duration before the end of the current TXOP, as shown in FIG. 10. In one embodiment, the channel monitor module 810 uses the network allocation vector (NAV) or a parameter equivalent to the NAV to estimate the end of a TXOP. After exiting monitor mode, the channel monitor module 810 reassociates with card-B. In one embodiment, the channel monitor module 810 sends channel reports (complete or partial) to card-B, possibly by piggybacking ACK packets.

Figure 9:
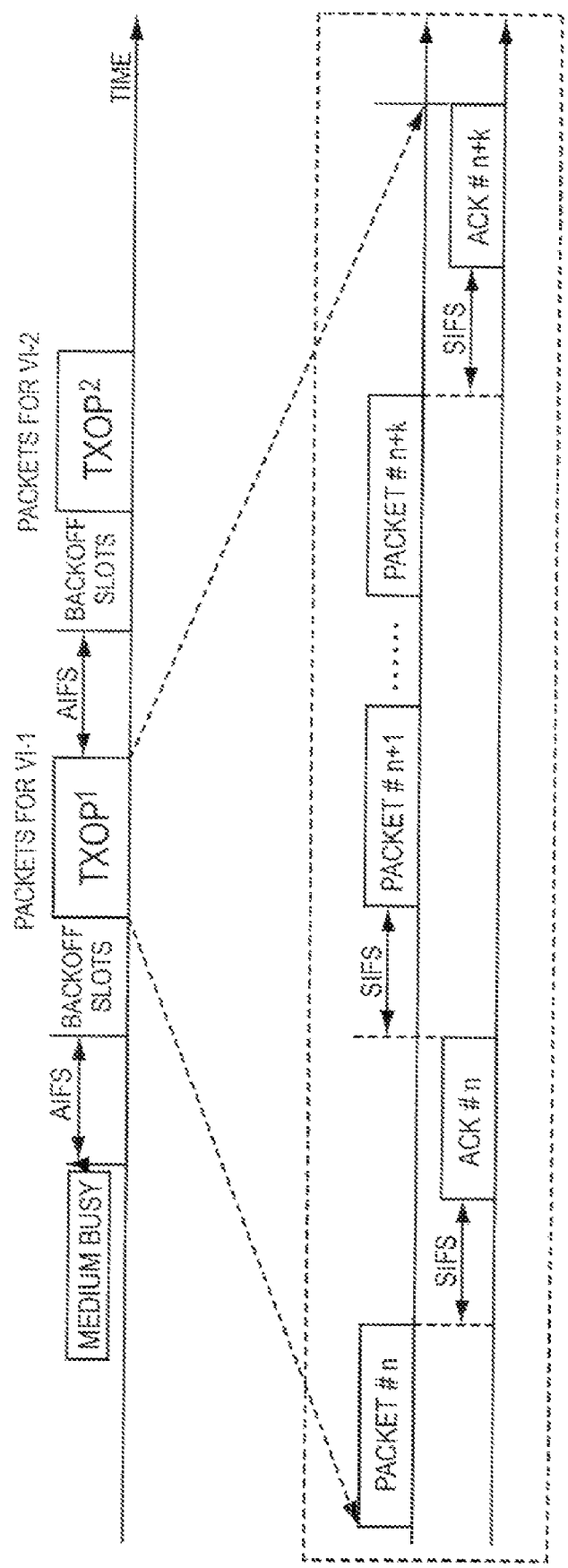
FIG. 9 is a timing diagram illustrating the transmission of TXOP packets by a video device on WLAN-B, in accordance with an embodiment of the present invention.

FIG. 9 is a timing diagram illustrating the transmission of multiple TXOP packets on WLAN-B, in accordance with an embodiment of the present invention. The flow of multimedia streams from card-B to the video devices 125, VI-1 and VI-2, is shown. Each video device 125 is served for a TXOP duration of several MAC data packets.

FIG. 10 is a timing diagram illustrating the monitoring of channel characteristics by a non-target video device 125 on WLAN-B, in accordance with an embodiment of the present invention. As shown, non-target video device 125 initiates monitor mode a SIFS interval after the initiation of a TXOP by the target video device 125 and reassociates with card-B a SIFS interval before the end of the TXOP by the target video device 125. More specifically, as shown, a second video device 125 (VI-2) monitors other channels while a first video device 125 (VI-1) is transmitting packets during a TXOP1 (offset by introductory and conclusory SIFS intervals); and the first video device 125 (VI-1) monitors other channels while the second video device 125 (VI-2) is transmitting packets during a TXOP2 (offset by introductory and conclusory SIFS intervals).

Figure 11:
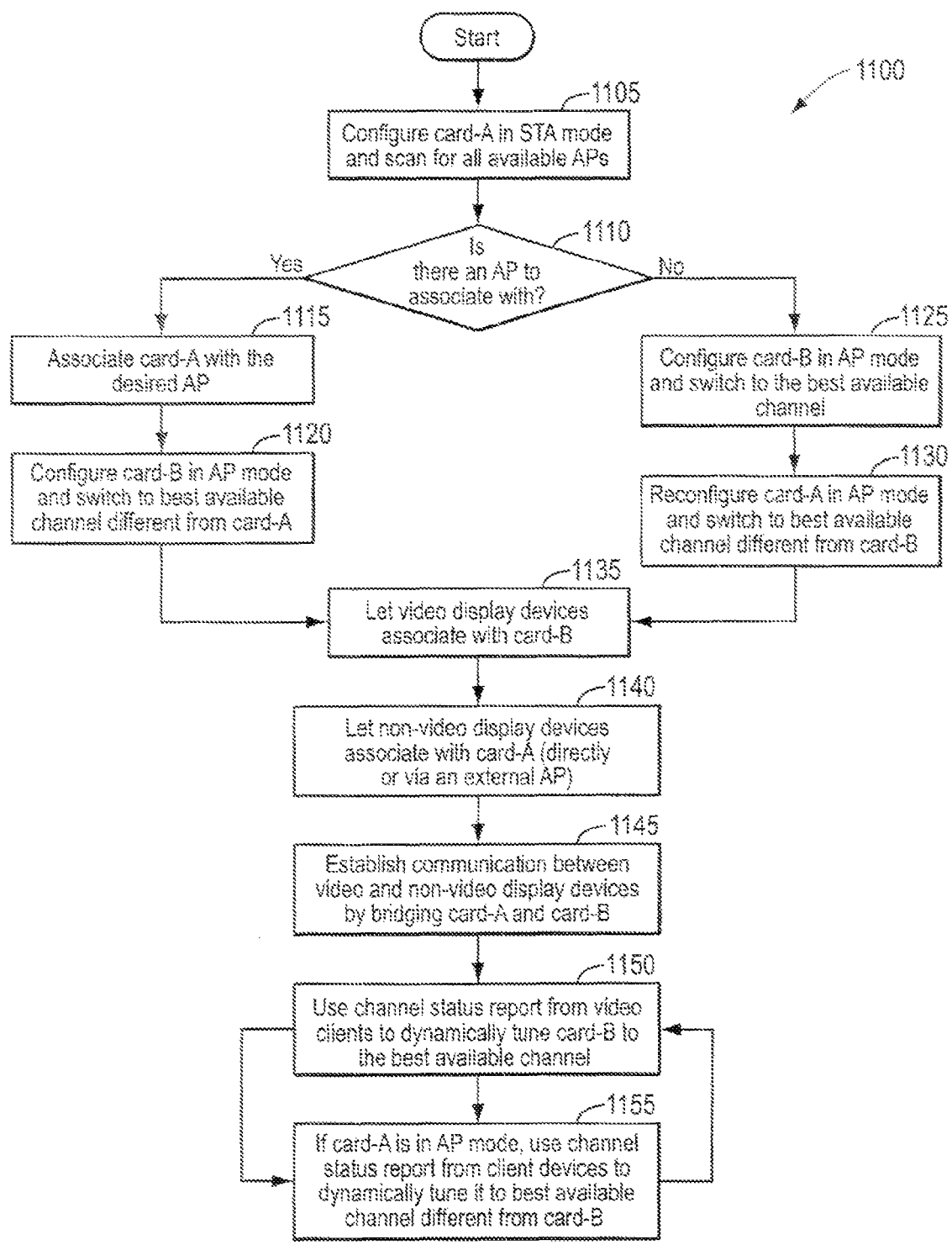
FIG. 11 is a flowchart illustrating a method of transmitting packets on a dual-WLAN network, in accordance with an embodiment of the present invention.

FIG. 11 is a flowchart illustrating a method 1100 of transmitting packets on a dual WLAN network, in accordance with an embodiment of the present invention. Method 1100 begins with card-A in step 1105 initially configuring itself as a STA and scanning for external APs. Card-A in step 1110 determines whether an external AP exists to associate with.

If an external AP exists, then card-A in step 1115 is configured to act as a STA aid associates with the external AP, using the channel of the external AP. In step 1120, card-B determines and switches to an initial channel different from card-A. In one embodiment, the initial channel for card-B is selected based on channel characteristics determined by card-A, card-B and/or card-C. In one embodiment, the initial channel for card-B is selected randomly from the remaining channels. In one embodiment, the initial channel for card-B is selected by the user. Various combinations are also possible for selecting the initial channel of card-B. Method 1100 then proceeds to step 1135.

If an external AP does not exist, then card-B in step 1125 determines and switches to an initial channel. In one embodiment, the initial channel is selected based on channel characteristics determined by card-A, card-B and/or card-C. In one embodiment, the initial channel for card-B is selected randomly from all channels. In one embodiment, the initial channel for card-B is selected by the user. Various combinations are also possible for selecting the initial channel of card-B. Card-A in step 1130 is configured to AP mode, and switches to an initial channel different from card-B. In one embodiment, the initial channel for card-A is selected based on channel characteristics determined by card-A, card-B and/or card-C. In one embodiment, tie initial channel for card-A is selected randomly from the remaining channels. In one embodiment, the initial channel for card-A is selected by the user. Various combinations are also possible for selecting the initial channel of card-A. Method 135 then proceeds to step 1135.

In step 1135, the video devices 125 associate with card-B. The legacy devices 120 in step 1140 associate with card-A (either directly or indirectly via an external AP). The chipset bridge 345 establishes communication channel between card-A and card-B and thus between the legacy devices 120 of WLAN-A and the video devices 125 of WLAN-B.

In step 1150, card-B receives channel reports from the video devices 125 and, if needed, dynamically tunes to the best available channel (different from card-A, if card-A is operating as a STA). If card-A is in AP mode, card-A may be dynamically tuned to the best available channel different from new channel of card-B. In one embodiment, card-A selects the best available channel using the channel characteristics determined by the video devices 125 and sent to card-B. In one embodiment, card-A selects the best available channel using channel characteristics determined by card-C. In one embodiment, card-B informs card-A which is the best available channel for it. Other best channel selection mechanisms are also possible. Method 110 then returns to step 1150.

Figure 12:
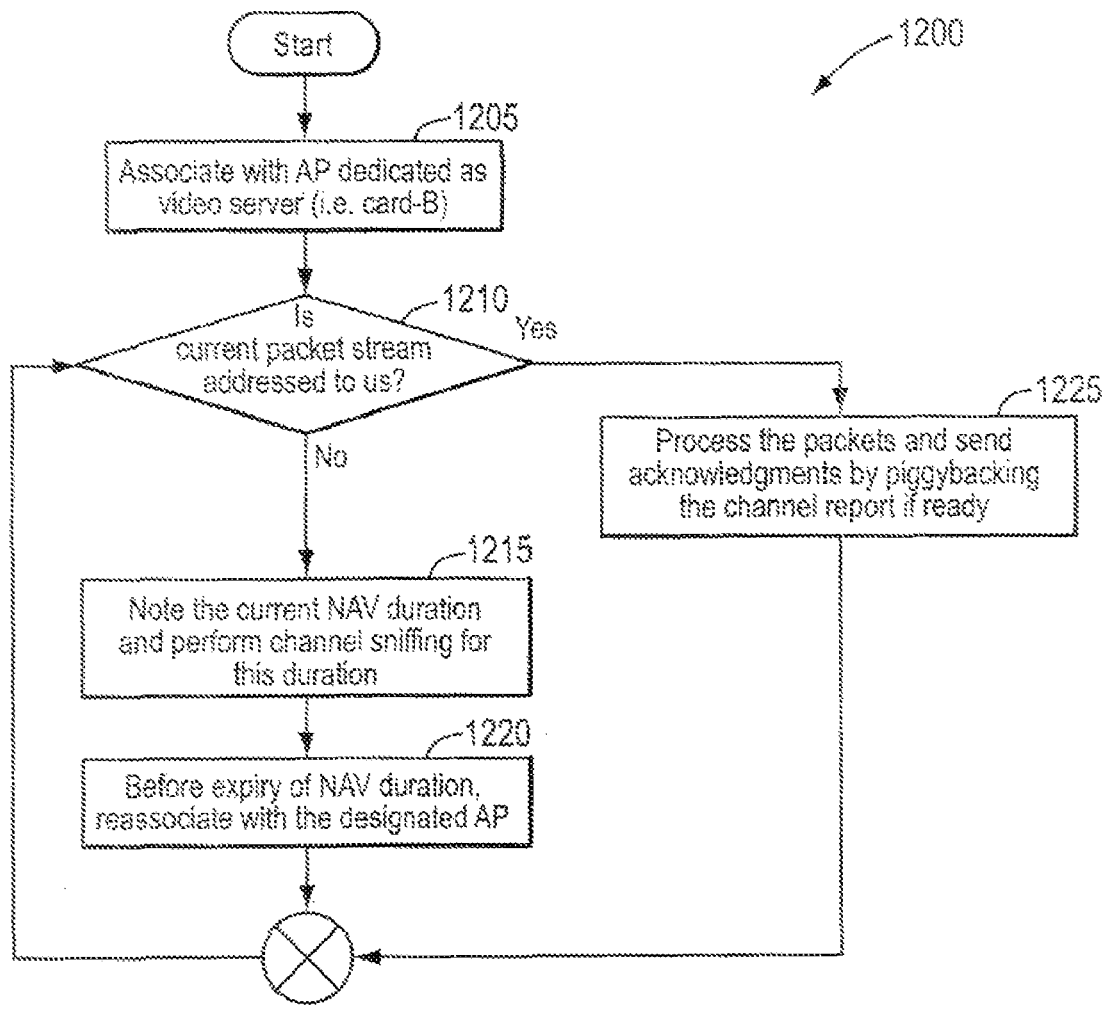
FIG. 12 is a flowchart illustrating a method of monitoring channel characteristics by a video device on WLAN-B, in accordance with an embodiment of the present invention.

FIG. 12 is a flowchart illustrating a method 1200 of monitoring channel conditions by a non-target video device 125 on WLAN-B, in accordance with an embodiment of the present invention. Method 1200 begins with the video device 125 in step 1205 associating with card-B. In step 1210, the video device 125 determines whether the incoming TXOP stream is directed at it. If the incoming stream is not directed at video device 125, i.e., the video device 125 is a non-target video device 125, then the non-target video device 125 in step 1215 notes the NAV or equivalent duration, enters monitor mode possibly a SIFS duration after the beginning of the TXOP stream, and gathers channel characteristics. The non-target video device 125 in step 1220 reassociates with card-B before the expiry of the NAV or equivalent duration, e.g., possibly a SIFS duration before the scheduled end of the TXOP. Method 1200 returns to step 1210. If the incoming stream is directed at the video device 125, i.e., the video device is a target video device 125, then the target video device 125 in step 1225 processes the incoming TXOP packets and sends ACKs, piggybacking channel reports within one or more of the ACKs. In one embodiment, the target video device 125 piggybacks channel reports if they are deemed complete (e.g., all channel characteristics for all available channels). In one embodiment, the target video device 125 piggybacks channel reports even if they are deemed partial (e.g., all channel characteristics for one of many channels or only some channel characteristics of one or more channels). It will be appreciated that, since the WLAN-B may use proprietary standards, ACKs can be formatted to include channel reports. Method 1200 then returns to step 1210.

Although embodiments herein have been described with reference to a dual WLAN network (WLAN-A and WLAN-B), one skilled in the art will recognize that any number of WLANs can be incorporated into the multiple WLAN network. Further, any number of dedicated channel-monitoring chipsets (e.g., card-C) can be incorporated into a WLAN network.

Embodiments of the invention may improve the quality of video streaming over a wireless home network. Embodiments of the invention may allow video devices on a separate network that uses standard and/or proprietary QoS technologies to improve reliable video streaming. Also, embodiments may allow dynamic channel switching to reduce susceptibility to changes in interference/noise.

In one embodiment, it will be appreciated that card-B may be configured to send a digital television signal to a set top box 130, which is configured to receive and convert the digital television signal to legacy analog for legacy television sets.

In one embodiment, FEC mechanisms may be added to card-B and to each set top box 130 to make communication more reliable. For example, card-B may include an MPEG-based decoder, so that FEC can be implemented.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A media center system, comprising:
a first wireless controller operative to communicate with a first set of devices on a first WLAN using a first wireless standard;
a first network processor coupled to the first wireless controller and operative to establish wireless communication over a first channel with the first set of devices on the first WLAN;
a second wireless controller operative to communicate with a second set of devices on a second WLAN using a second wireless standard, the second wireless controller substantially dedicated for multimedia content delivery;
a second network processor coupled to the second wireless controller and operative to establish wireless communication over a second channel with the second set of devices on the second WLAN, the second channel being different than the first channel;
a first bridge communication module coupled to the first wireless controller;
a second bridge communication module coupled to the second wireless controller; and
a bridge coupling the first bridge communication module and the second bridge communication module.

2. The media center system of claim 1, wherein the first wireless controller is configured as a wireless access Point that manages the first WLAN.

3. The media center system of claim 1, wherein the first wireless controller is configured as a wireless station in wireless communication with an external access point that manages the first WLAN.

4. The media center system of claim 1, wherein the first wireless standard and second wireless standard are the same standard.

5. The media center system of claim 1, wherein the first wireless standard is a public standard and the second wireless standard is a proprietary standard.

6. The media center system of claim 5, wherein the proprietary standard is designed to provide reliable quality of service for video-based streaming.

7. The media center system of claim 1, further comprising a channel monitor capable of monitoring channel characteristics of at least one other channel of the second WLAN.

8. The media center system of claim 7, wherein the channel monitor includes a third wireless controller operative to monitor the channel characteristics of the at least one other channel while the second wireless controller is operating;

a third network processor coupled to the third wireless controller and operative to establish communication over the at least one other channel; and a third bridge communication module coupled to the third wireless controller and to the bridge.

9. The media center system of claim 7, wherein the channel monitor is associated with at least one of the devices of the second set of devices, and wherein the channel monitor is configured to monitor the channel characteristics of the at least one other channel during a time period while another device of the second set of devices is using the second channel.

10. The media center system of claim 7, further comprising a channel selection module operative to select a new channel from the at least one other channel based on the channel characteristics of the at least one other channel, and operative to configure the second network processor to switch to the new channel.

11. A method, comprising:
communicating with a first set of devices on a first WLAN using a first wireless controller and a first wireless standard;
establishing wireless communication over a first channel with the first set of devices on the first WLAN using a first network processor coupled to the first wireless controller;
communicating with a second set of devices on a second WLAN using a second wireless controller and a second wireless standard, the second wireless controller substantially dedicated to multimedia content delivery; and
establishing wireless communication over a second channel with the second set of devices on the second WLAN using a second network processor coupled to the second wireless controller, the second channel being different than the first channel,
wherein the first wireless controller is coupled to a first bridge communication module and the second wireless controller is coupled to a second bridge communication module, and
wherein the first bridge communication module and the second bridge communication module are coupled to each other via a bridge.

12. The method of claim 11, wherein the first wireless controller is configured as a wireless access point that manages the first WLAN.

13. The method of claim 11, wherein the first wireless controller is configured as a wireless station in wireless communication with an external access point that manages the first WLAN.

14. The method of claim 11, wherein the first wireless standard and second wireless standard are the same standard.

15. The method of claim 11, wherein the first wireless standard is a public standard and the second wireless standard is a proprietary standard.

16. The method of claim 11, further comprising monitoring channel characteristics of at least one other channel of the second WLAN.

17. The method of claim 16, wherein the step of monitoring includes using a third wireless controller to monitor the channel characteristics of the at least one other channel while the second wireless controller is operating; and further comprising establishing communication over the at least one other channel using a third network processor coupled to the third wireless controller and establishing communication between a third bridge communication module and the bridge.

18. The method of claim 16, wherein the step of monitoring is performed by at least one of the devices of the second set of devices, and the step of monitoring includes monitoring the channel characteristics of the at least one other channel during a time period while another device of the second set of devices is using the second channel.

19. The method of claim 16, further comprising selecting a new channel from the at least one other channel based on the channel characteristics of the at least one other channel, and configuring the second network processor to switch to the new channel.

20. A system, comprising:
a first wireless controller operative to communicate with a set of devices on a WLAN using a wireless standard;
a first network processor coupled to the first wireless controller and operative to establish wireless communication over a first channel with the set of devices on the WLAN;
a second wireless controller operative to monitor channel characteristics of a second channel of the WLAN different than the first channel while the first wireless controller is operating;
a second network processor coupled to the second wireless controller and operative to establish communication over the second channel;
a first bridge communication module coupled to the first wireless controller;
a second bridge communication module coupled to the second wireless controller; and
a bridge coupling the first bridge communication module and the second bridge communication module.

* * * * *